United States Patent [19]

Wegner et al.

[11] 4,141,378

[45] Feb. 27, 1979

[54] PRESSURE PIPELINE STRUCTURE AND METHOD

[75] Inventors: John W. Wegner, Du Page County; Herbert L. Porter, Clarendon Hills, both of Ill.

[73] Assignee: Advance Valve Installations Inc., Hinsdale, Ill.

[21] Appl. No.: 647,917

[22] Filed: Jan. 9, 1977

Related U.S. Application Data

[63] Continuation-in-part of Ser. No. 596,971, Jul. 17, 1975, abandoned.

[51] Int. Cl.² .............................................. F16K 43/00
[52] U.S. Cl. ...................................... 137/315; 138/94; 285/197; 137/317
[58] Field of Search .................. 137/315, 317; 138/89, 138/94.3, 94; 251/327, 329; 220/324, 327, 325, 328; 285/197

[56] References Cited

U.S. PATENT DOCUMENTS

| | | | |
|---|---|---|---|
| 1,389,542 | 8/1921 | Wereley | 220/327 |
| 1,808,715 | 6/1931 | Reynolds | 137/317 |
| 2,770,532 | 11/1956 | Mason | 137/315 |
| 3,013,770 | 12/1961 | Anderson et al. | 251/329 |
| 3,187,776 | 6/1965 | Snell, Jr. | 138/94.3 |
| 3,192,613 | 7/1965 | Allen | 251/329 |
| 3,258,243 | 6/1966 | Bryant | 137/315 |
| 3,270,910 | 9/1966 | Lusk | 220/327 |
| 3,319,661 | 5/1967 | Shindler | 138/94.3 |
| 3,578,407 | 5/1971 | Arnold et al. | 220/327 |
| 3,891,146 | 6/1975 | Blazek | 138/94.3 |
| 3,951,300 | 4/1976 | Kalasek | 220/327 |

OTHER PUBLICATIONS

W. C. Lester "Insert Butterfly Vacuum Valve Assembly", vol. 16, Jan. 1974, of I.B.M. Technical Disclosure Bulletin, pp. 2711–2712.

Primary Examiner—Martin P. Schwadron
Assistant Examiner—G. L. Walton
Attorney, Agent, or Firm—Morris Spector

[57] ABSTRACT

This invention relates to a pressure/vacuum system apparatus; one part of such apparatus being an economical fitting, another part being operating mechanism, another part being a means to join such fitting to such operating mechanism in a substantially fluid-tight manner, all operable to perform certain functions together without shutting down the pressure/vacuum system they are attached to. Some installations require many fittings. In many instances an operating mechanism may be attached to an operated fitting for only short periods of time and then disconnected therefrom, leaving the operated fitting in (a) a dormant condition in relation to its functions to the pressure/vacuum system, or (b) in a functional condition in relation to the pressure/vacuum system. Thus, in many cases a single operating mechanism may be used for operating each of a number of different fittings from time to time as required. Although the operating mechanism may be rather expensive, the fittings economy of the large number of fittings on which the mechanism may be used selectively lends economical practicality to the invention. The operating mechanism and the fitting may be joined in an essentially fluid-tight manner and/or separated and a fluid-tight member may be installed or removed from the fitting and the functions of the apparatus performed without substantial fluid transfer to or from the areas ambient to the apparatus and without shutting down the pressure/vacuum system.

7 Claims, 17 Drawing Figures

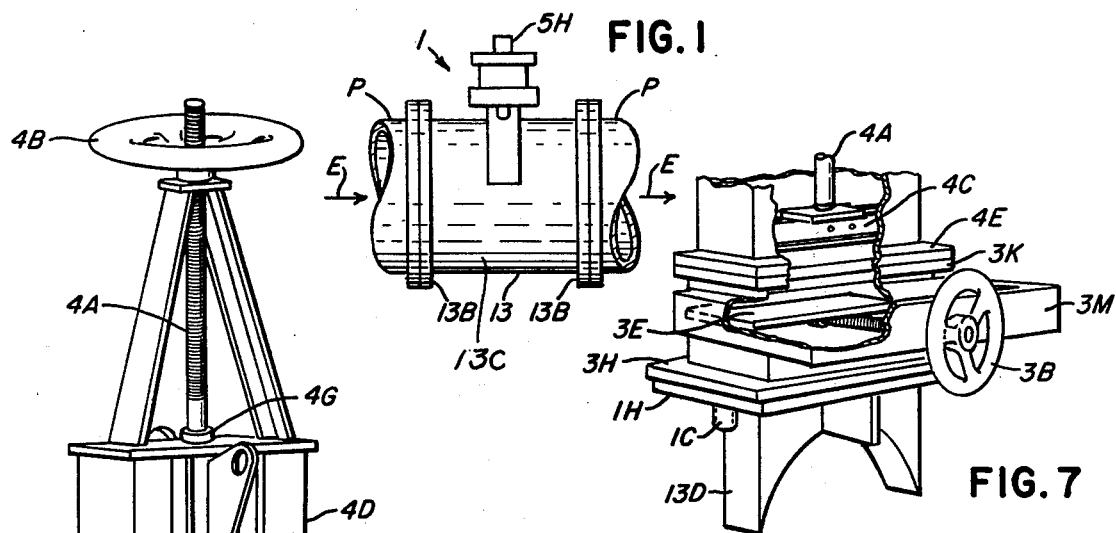
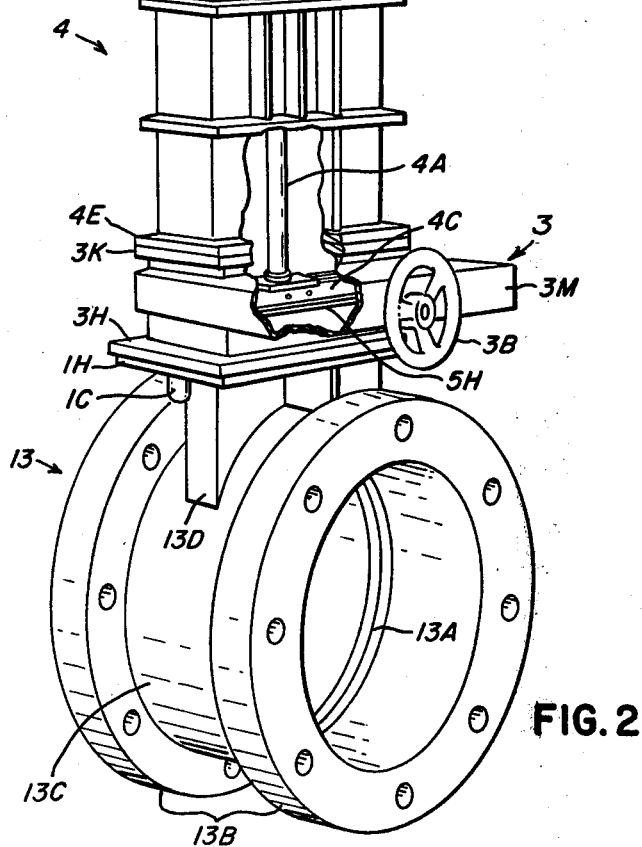
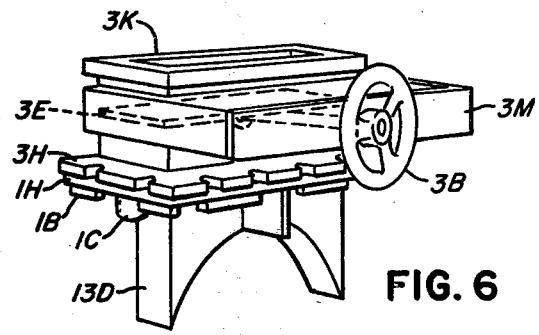
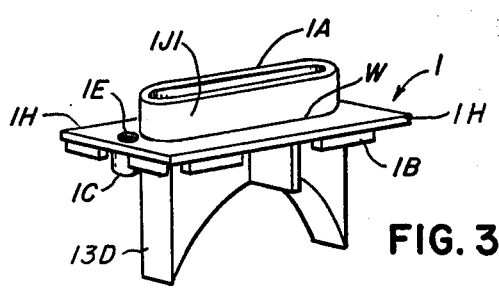
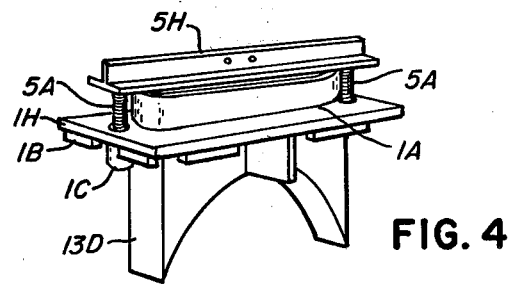

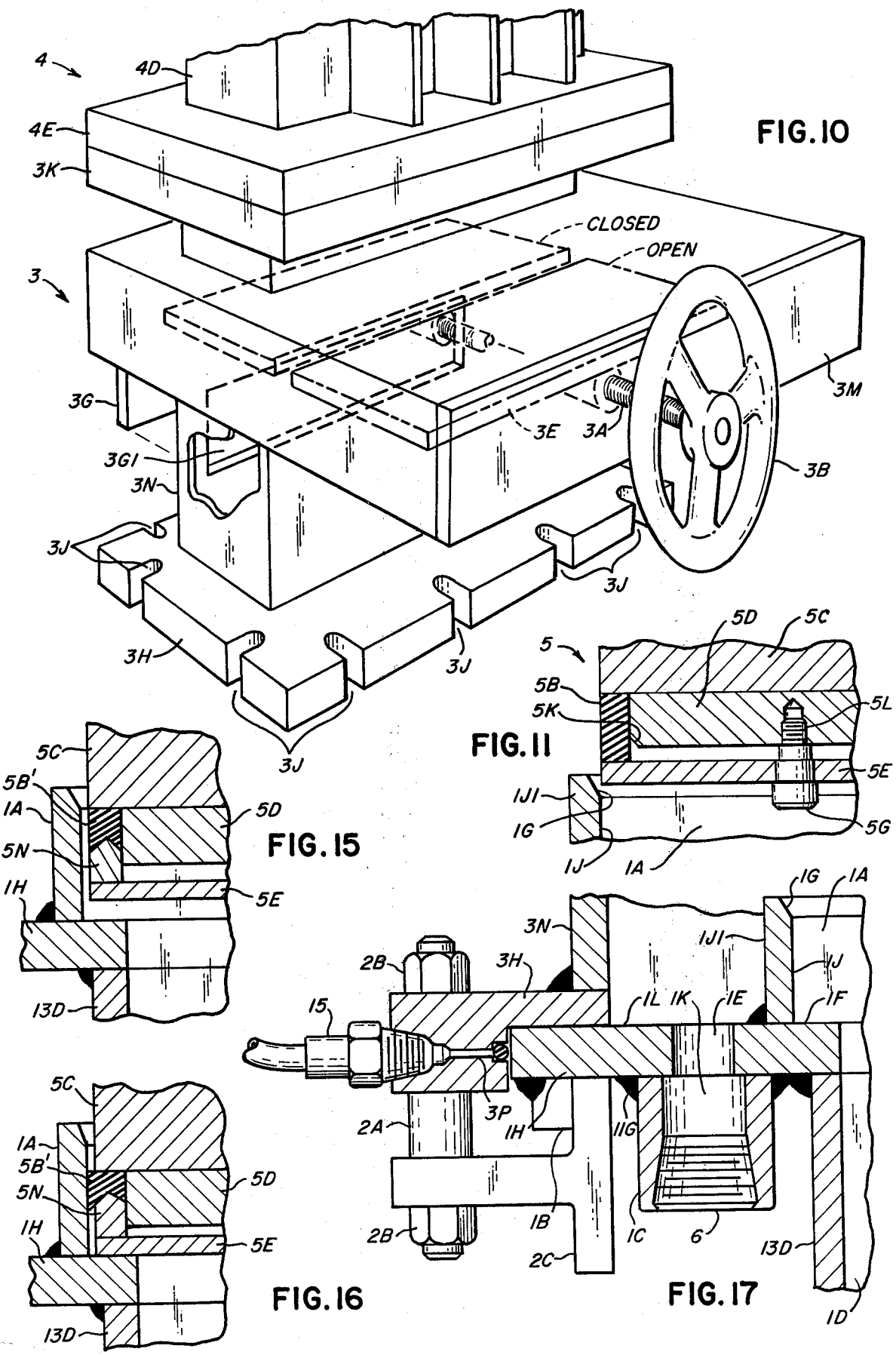

PRESSURE PIPELINE STRUCTURE AND METHOD

This application is a continuation in part of our application Ser. No. 596,971, filed July 17, 1975, now abandoned, the contents of which are hereby incorporated by reference.

In a pressure system, for instance a high pressure liquid or gas pipeline, it is often necessary to valve or control the flow in the system without interrupting the operation of the system. Valves and devices to perform such action are relatively expensive. In constructing a section of a system it is desirable to avoid the installation of such equipment where the need is only remotely problematical. In many instances such equipment, when deemed necessary, will require infrequent operation to valve or control the pipeline, with perhaps more than a decade between operations. It is an object of this invention to provide fittings of the above mentioned character, that can perform the above mentioned functions and be comparatively inexpensive to manufacture.

A system of the above type may have a large number of fittings which may be identical, or different, but the required operating mechanism for each may be identical. It is an object of this invention to make each of the fittings without any operating mechanism and yet be able to function in each of its alternate positions, and to make an operating mechanism that can be selectively connected to any one of said fittings, and operate that fitting from either of its positions to its alternate position, and can then be removed from the fitting, all while the fitting remains connected to and part of the pressure/vacuum system.

Another object of this invention is to provide apparatus that are adaptable to a large range of sizes that valves and flow control devices are now manufactured.

Another object of this invention is to provide apparatus that are adaptable to operate with a high degree of safety and certainty event when exposed to corrosive pipeline fluids or those systems which operate at extreme hypo or hyper-ambient temperatures.

Another object of the invention is to provide a fitting that doesn't have to be mated with a highly specialized auxiliary mechanism, designed especially for such fitting; rather to provide a fitting that is readily adapted for use with presently manufactured standard items such as pressure vessels, valve bodies, flow control devices, pipelines, and tanks, etc., by making relatively low cost changes to such items, thereby taking advantage of existing highly developed technology of production techniques and processes for such items, resulting in a relatively low ultimate cost of such fittings when using them in this pressure/vacuum system in conjunction with auxiliary mechanisms.

Another object of this invention is to provide a means of joining the operating mechanism to the fitting in a substantially fluid-tight manner wherein all or most of the cost of such joining means is a part of the operating mechanism rather than of the fitting thereby providing further particular economy to such fitting's manufacture.

Another object of this invention is to provide a closure mechanism that is versatile with respect to the kinds of seal material that are compatible with the closure design.

THE DRAWINGS

FIG. 1 is a side view of a portion of a pipeline in which a valve body and fitting of the present invention has been installed;

FIG. 2 is a prospective view of the operating mechanism, partially broken away, attached to the valve body and fitting of the pipeline;

Figure 8:
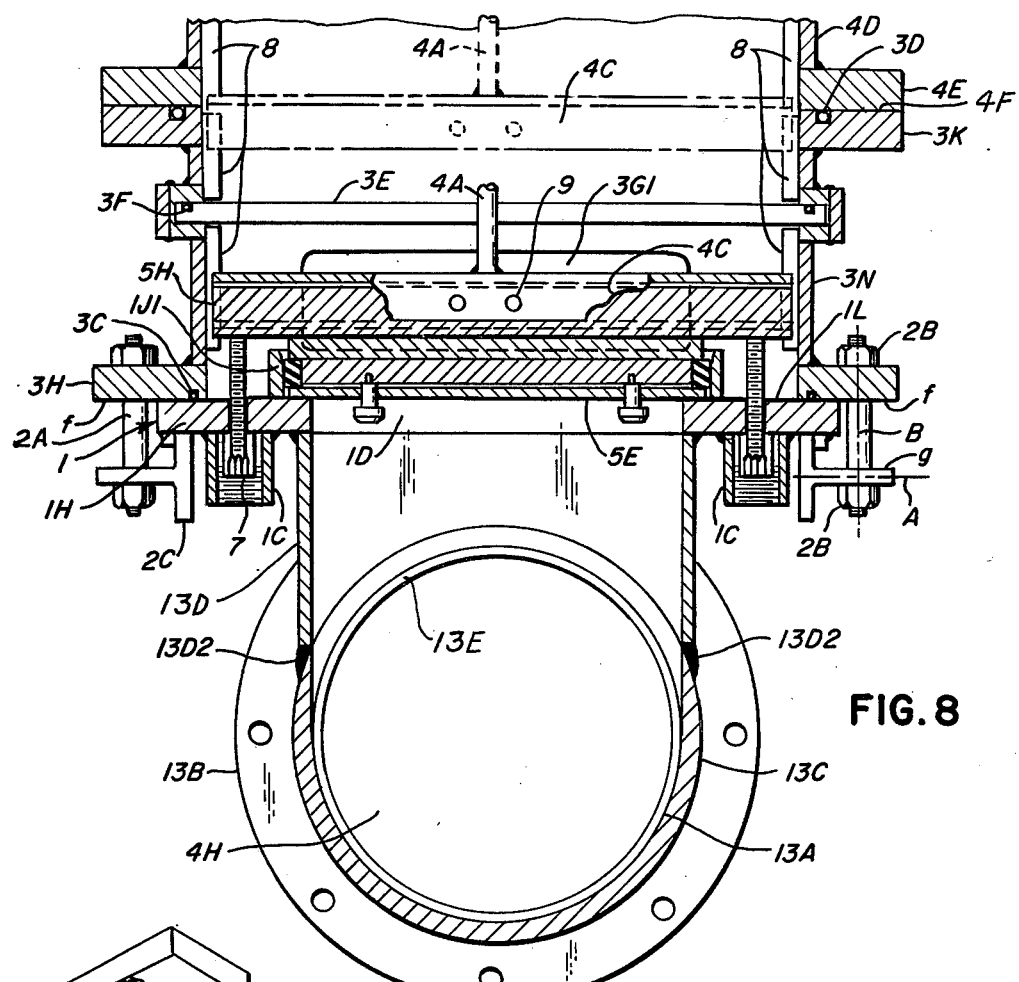
Figure 9:
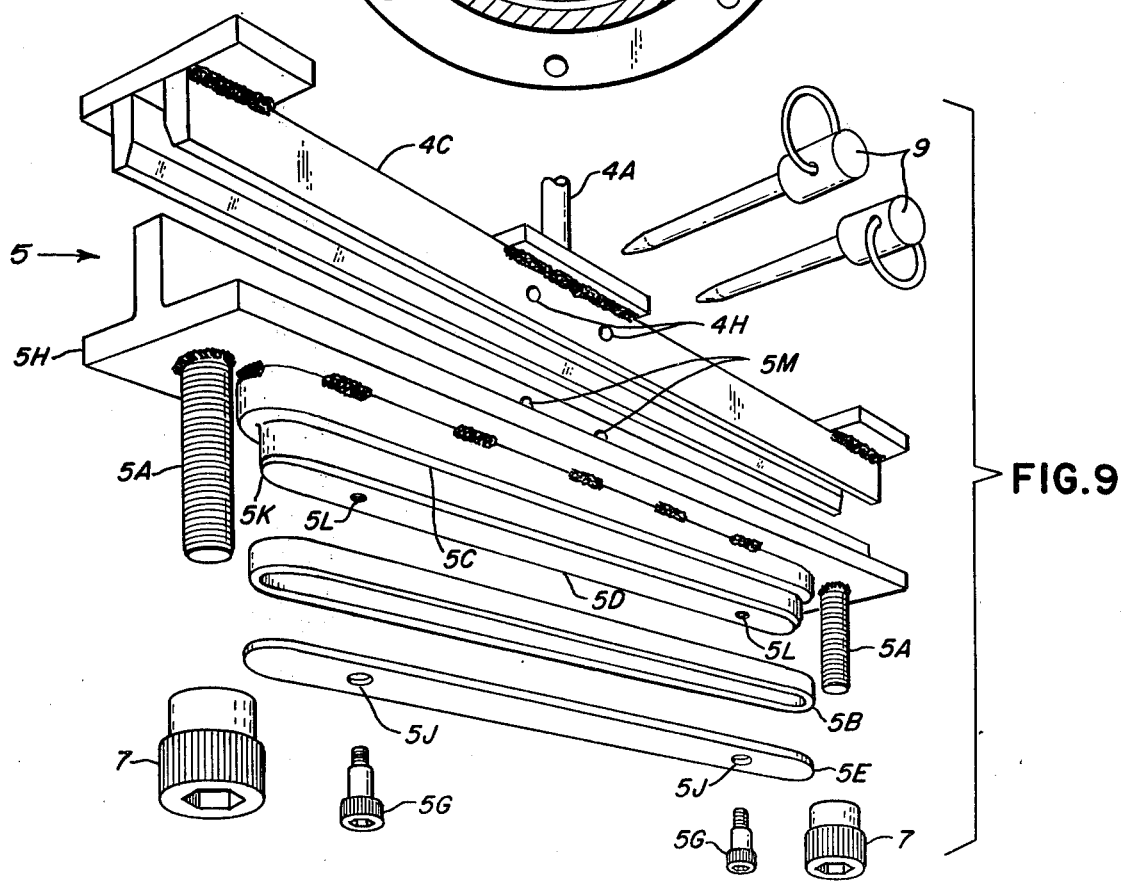
Figure 12:
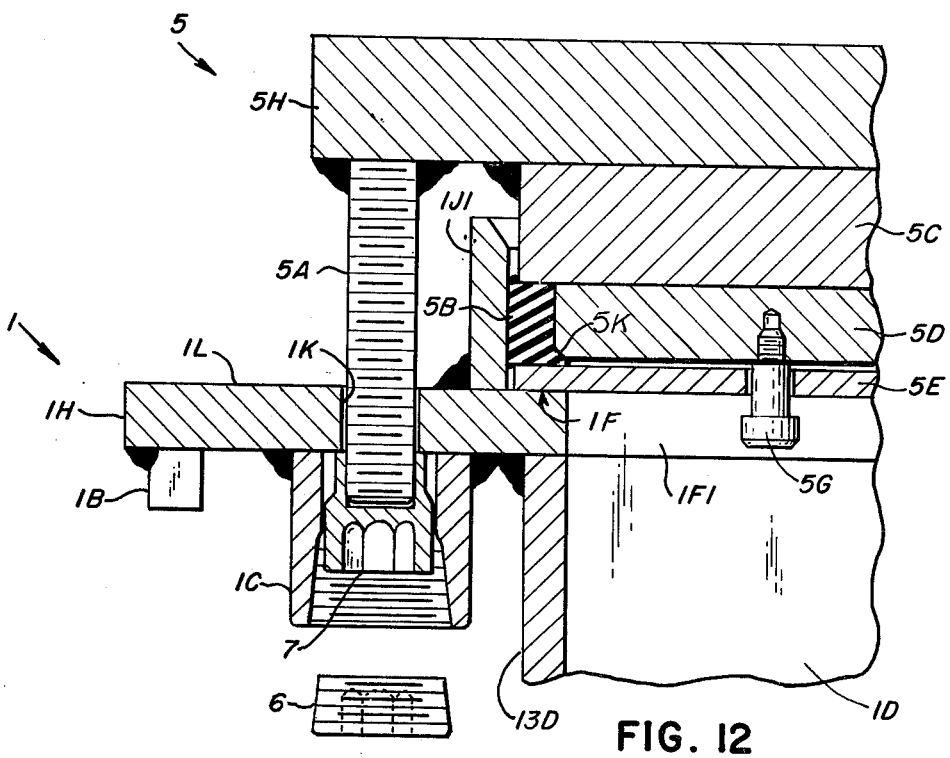
Figure 14:
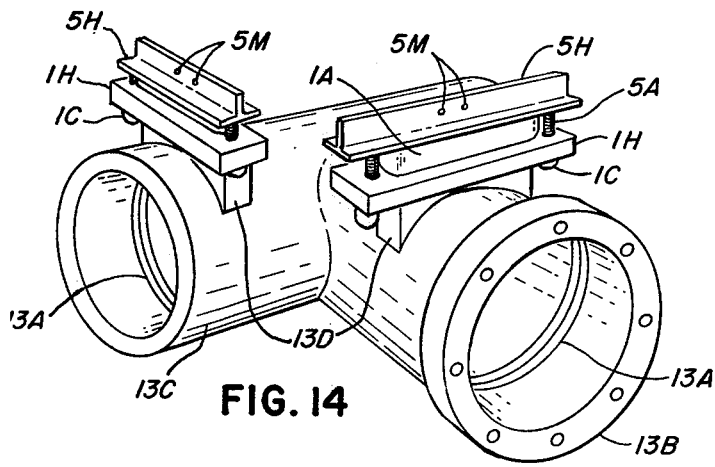
Figure 13:
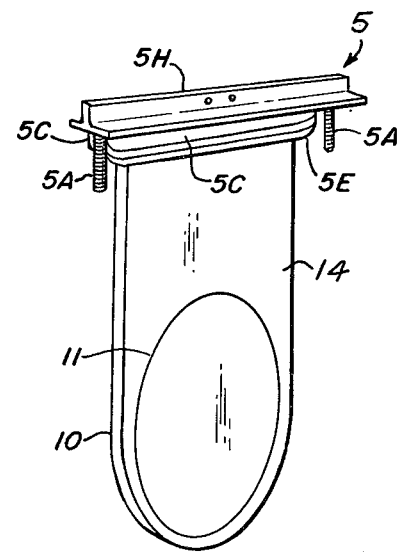
Figure 18:
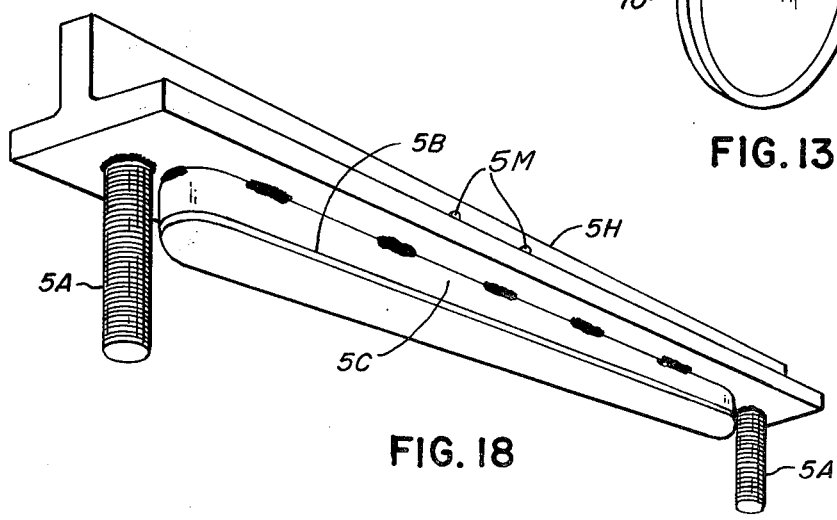

FIGS. 3 thru 7 are progressive views showing the fitting with various parts of the operating mechanism thereon, the other parts of that mechanism being omitted;

FIG. 8 is a longitudinal sectional view taken along the line 8—8 of FIG. 2, thru the pipeline valve body, the pass-thru valve and a portion of the bonnet assembly;

FIG. 9 is a perspective exploded view of the closure member and the means for moving it and the means for bolting it in position;

FIG. 10 is a perspective view of the pass-thru valve and the bottom of the bonnet assembly;

FIG. 11 is a fragmentary longitudinal sectional view illustrating the position of the closure member as it is being lowered to close off the chest area of the valve body;

FIG. 12 is a view similar to FIG. 11 showing the closure member bolted in its final closing position;

FIG. 13 is a perspective view of the fitting through post closure member with a main gate attached thereto;

FIG. 14 is a perspective view of this invention applied to a pipeline tee;

FIG. 15 shows the use of an alternate type of sealing gasket;

FIG. 16 is a section of the gasket of FIG. 15 when the gasket has been compressed to form a seal around the closure member; and FIG. 17 is a section showing an alternate sealing arrangement for the joining means.

DESCRIPTION OF PREFERRED EMBODIMENT

Reference may now be had more particularly to the drawings wherein like reference numerals designate like parts throughout.

FIG. 1 shows a portion of a high pressure vessel P, in this instance a high pressure oil or gas pipeline which includes a gate valve body 13 having a passageway that provides continuity of the fluid flow passageway E—E through the pipeline. The gate valve body is of a common design and includes a chest forming area 13D, a body cylinder 13C, having a flow line E—E' for communication with a pipeline, one or two gate seating surfaces 13A (FIGS. 2 and 8) and means for making a fluid tight attachment to a pressure piping system such as annular flanges 13B each of which has eight equally spaced apart bolt hole 13B-1 for receiving bolts that connect each flange to a similar flange in a pressure pipieline or similar vessel. The body cylinder normally has a radial through-port 13E (FIG. 8), perpendicular to the flow line E—E' to accommodate the passage of a main gate 14 (FIG. 13) to be later described. Means constituting a chest area 13D is attached as by welding to the body cylinder 13C in a fluid-tight manner around the radial through-port 13E. The chest area 13D has a through-port (FIG. 13) sized and shaped to accommodate the passage of a main gate 14 (FIG. 13). The two above mentioned through-ports accommodate the passage of a gate 14 (FIG. 13) in an unobstructed manner.

A fitting 1 is attached to the chest 13D of the gate valve body. The fitting includes a rectangular fitting flange 1H with a through-port 1D sized and positioned to accommodate the unobstructed passage of the main gate 14 as it is moved into the valve body 13. On the fitting flange 1H there is a closure chamber 1A comprising an open-ended oval tube welded or otherwise attached to the flange 1H in a fluid-tight manner. The closure chamber 1A is sized and shaped so that the top of the fitting flange 1H provides an interior stop ledge 1F (FIGS. 8 and 12) surrounding the through-port 1D. The closure chamber 1A has an annular guide bevel 1G (FIG. 11) that facilitates alignment and positioning of a closure member assembly 5 (to be later described) as it enters the closure chamber 1A. The closure chamber 1A has a closure seating surface 1J (FIG. 11). Because of the positive displacement of a loop seal 5B against seating surface 1J as shown in FIG. 12, under most service conditions the surface 1J need not be a precision machined surface. Two hold down through holes 1E are sized and positioned in the fitting flange 1H to receive hold down bolts 5A from a closure member 5 to be presently described. On the end the plate 1H two hold down chambers 1C are attached to 1H in line with and surrounding the respective through-holes in a fluid-tight manner as b welding. Each chamber 1C forming a through-port 1K (FIG. 12) that can have a substantially fluid-tight temporary closure to prevent fluid transfer therethrough. As shown in FIGS. 8, 9, and 12 the chamber 1C accommodates a length of bolt 5A within the chamber to permit the installation of a hold down socket nut 7. Each chamber 1C constitutes a half of a pipe coupling, a pipe plug closure 6 is threadable into 1C to seal it when necessary. A seating surface 1L on the plate 1H provides a mating surface for ring seal 3C (FIG. 8). Because of nature and location of seal 3C, the seating surface 1L generally does not need to be a precision machined surface since seal 3C will be displaced by system pressure to fill and seal any minor surface irregularities. If the type of seal used for 3C is such that it calls for special machining, as shown in the examples a seal groove, (or if the system fluid is such that a special machined seating surface is dictated), all or the most of the special machining can be done to the pass-through valve flange 3H to be hereafter explained, thereby avoiding such machining cost in the manufacture of each of the many fittings.

A fitting through-port closure member assembly 5 is shown in FIG. 12 and shown in exploded view in FIG. 9. It comprises a rigid rectangular closure plate or beam 5H of a T-shaped cross-section to the bottom of which hold down bolts 5A are welded one at each end. Near the center of the beam 5H, on its vertical web, are formed through-holes 5M to accommodate the passage of stud detent pins 9. The hold down bolts 5A extend through the flange 1H sufficiently for engagement with hold down nuts 7, which retain the bolts 5A and thus holds the closure member 5 in place against the system pressure.

A closure member body 5C having two flat, parallel faces and shaped to make a slight clearance fit with the internal faces of closure chamber 1A is attached to the beam 5H. The body 5C is of sufficient thickness that when it is held fully positioned in the closure 1A it extends down into chamber 1A below guide bevel 1G (FIGS. 8 and 12). The body 5C is of sufficient strength to withstand the stresses imposed by system pressure without appreciable deformation. A closure member seal spacer 5D with a perimeter shaped essentially as body 5C is secured to the underside of 5C. It is smaller, to leave a uniform width gasket receiving perimeter groove on its underside which groove is bottomed by a floating spacer plate seal retainer 5E which is of the same perimeter as the body 5C and rests on the heads of two retainer shoulder screws 5G that thread into tapped holes 5L in the seal spacer 5D, the screws passing thru slightly oversized holes 5J and 5E that guide the floating retainer 5E. A sealing gasketing ring 5B surrounds the spacer 5D and, in its uncompressed condition is of an outside perimeter the same as that of 5C and 5E as may be seen from FIG. 11. The spacer 5D has a perimeter bevel 5K to avoid pinching of the seal 5B between 5B and 5E during its installation on the assembly.

As shown in FIG. 9 the bolts 5A and the body 5C are permanently attached to (or an integrally formed part of) beam 5H. The spacer 5D is permanently attached to (or an integrally formed part of) the body 5C. The closure member seal 5B is compatable with the system fluid(s), and of sufficiently plasticity to deform and effect a seal between body 5C and chamber 1A when subjected to the mechanical forces here encountered, and essentially spans the elongated ring cavity formed when body 5C, the spacer 5D and the retainer 5E are assembled with 5E as far from 5D as retainer screws 5G will permit. The assembly 5 may enter the chamber 1A without the seal ring 5B effecting a seal between the body 5C and the chamber 1A, prior to retainer 5E contacting ledge 1F or even effecting a sealing action at that time.

FIG. 12 indicates the behavior of the seal 5B in response to mechanical displacement forces. After the retainer 5E bears against the surface 1F of the fitting, further forcing of spacer 5D towards retainer 5E displaces the seal in all unrestricted directions, outwardly towards the seating surface 1J and into the bevel 5K, thus displacing the seal 5B into fluid tight contact against the surface 1J, approximately as indicated in FIG. 12. In operations in response to the forces of the pressure differentila, any further small displacement of 5E towards 5D tends to improvem the fluid-tightness of the sealed area. Because of the positive displacement of the loop seal 5B upon axial compression due to movement of 5D towards the seal retainer 5E (FIG. 12), the surface 1J need not be a precision machined surface.

The outside dimensions of the flange 3H is extended, and clearance slots 3J are formed through flange 3H about its perimeter. Shoulder studs 2A; nuts 2B; brackets 2C; and bracket retainers 1B make up the remainder of the joining means for joining the pass-through valve 3. The bracket retainers 1B are the only parts of the joining means that is formed or attached as a permanent part of the fitting assembly 1, which adds only a modest cost to the fitting. The diameter of each shoulder stud 2A is such that it bears firmly against the surface "f" of flange 3H and surface "g" of bracket 2C without tendency to deform into the slot 3J under the load of nuts 2B and operating stresses. The length of the shoulder on stud 2A is such that when nuts 2B are both tightened securely (and such shoulders are bearing on the surface "f" of 3H and "g" of 2C as above mentioned), the the axis A—A' of the bracket 2C, FIG. 8, will be parallel to the planes of the flanges 3H and 1H; and the vertical axis of the bracket 2C, FIG. 8, will be perpendicular to flanges 3H and 1H. This takes advantage of some inherent structural strengths of that standard shape and inhibits bending of the bracket.

The bracket 2C is a common tee iron with suitably positioned through-holes to receive the stud 2A in positions relative to slots 3J in flange 3H. The perimeter dimensions of flange 1H are such that when joining means 2 is assembled, the outside diameter of the shoulders on studs 2A provide a relatively small clearance between such shoulders of 2A and such perimeter of 1H. By accurately positioning the slot pattern of flange 3H such that each pair of diametrically opposite holes are equidistant from the longitudinal center-line of pass-through assembly 3, and if diametrically opposite perimeter points of flange 1H are equidistant from the longitudinal center-line of fitting assembly 1 then it can be seen that the two above mentioned center-lines will align relative to each other. The accuracy of such alignment is determined by the accurate location and forming of the perimeter of flange 1H, and the accurate construction and location of the component parts of joining assembly 2.

The fitting 1 is included in the pipeline at a small cost in order to permit future economical completion of the gate valve for use, should that become necessary, or future economical entry into the pipeline. Apparatus is provided for facilitating opening of the closure member 5 and performing the necessary pipeline operations at the fitting 1 while the pipeline is under pressure. This includes a pass-through valve 3 (FIGS. 2 and 8), a bonnet assembly 4 (FIGS. 2, 8, and 10), and means for joining that apparatus to the fitting 1.

The operating mechanism is composed of two main assemblies: the bonnet assembly 4 and the pass-through assembly 3. The assembly 4 comprises a bonnet housing 4D (FIG. 2) of adequate size to accomodate the dimensions of the closure assembly 5, the main gate 14 (FIG. 13), or any other combinations of tool assembles such as 5 and 10 required; guides 8 (FIG. 8) to guide and direct a tool guide/clevis 4C and a closure beam 5H in such a way as to permit the previously mentioned longitudinal close running fit of the beam 5H and the guide 4C while preventing substantial rotation of those parts, about the centerline axis of a main stem 4A. A tool guide/clevis 4C (FIGS. 2, 8, and 9) is attached to the stem 4A and in addition to preventing the aforementioned anti-rotational and guiding effects with guides 8, the clevis 4C has through-holes 4H so located that when clevis is nested over the beam 5H or other tools then holes 4H and holes 5M in the beam align with each other so that pins 9 may be passed through them. The holes 4H are sized to receive pins 9 but not the detent at the end of the pins 9. The main stem 4A is a round shaft to push and pull the various tools and assemblies through their various operations and of a smooth O.D. for a length to move throughout the entire range of longitudinal travel motion of the various tools and assemblies while maintaining a portion of the smooth O.D. section in main stem seal area 4G (FIG. 2) and has a sufficient additional length threaded to maintain threaded engagement with a stem actuator 4B throughout the entire range of longitudinal travel motion mentioned above. The stem actuator 4B both holds the stem 4A in axial position and engages the threads of stem 4A. By means of a captive ortatable nut in the top of 4B, stem 4A can be driven throughout its longitudinal travel. Flange 4E of the bonnet has at its bottom a seating surface 4F sized, constructed, and finished to provide a conventional bolted and sealed joint with flange 3K.

The pass-through assembly 3 is essentially a flanged end gate valve adapted and modified to fit this system as shown in FIGS. 8 and 10. On one end of its pass-through port is flange 3K and seal 3D mating with flange 4E and providing an adequate, sealed, temporary joint between the assemblies 3 and 4. For drawing clarity the fasteners have not been shown joining the flanges 4E and 3K as they are well known. The pass-through valve 3 has a gate 3E (FIGS. 8 and 10) with a seating surface (seal) 3F, a gate stem 3A (FIG. 10), stem actuator 3B, a bonnet 3M and a body 3N. All parts of the pass-through valve are designed to permit unobstructed through-passage of any tools and assemblies that are moved into and out of assemblies 1, 13, and 4 and such pass-through valve is further designed to have gate 3E move into a closed position in the pass-through-port and effect an essentially fluid tight isolation between the pressure system and the ambient environment. Both open and closed positions of gate 3E are indicated on FIG. 10. In addition, guides 8 are provided in the pass-through-port as they were in the assembly 4. A removably installable, fluid-tight pin access door 3G is provided on body 3N in such a position that when door 3G is removed, when closure member assembly 5 is in place and sealed, then pins 9 will be readily installed in or removed from the joint of clevis 4C and beam 5H. This permits convenient assembly and disassembly of the equipment during field operations. Access doors such as 3G are common in a variety of satisfactory designs in the boiler and pressure vessel industries.

A conventional main gate plate 10 (FIG. 13) for an industrial gate valve is included as part of the operating mechanism. It and a main gate seal 11 are designed and constructed according to valve industry standards to effect a safe and satisfactory fluid isolation with respect to the assembly 13 and its flow E—E' when the gate 10 is in position (closed) and seated on the seating surface 13A. The gate 10 is connected at one end to the lower surface of a beam 5H, so that the gate 10 may be joined to clevis 4C by the pins 9.

The fitting assembly 1, attached to the valve body 13 would have a closure member assembly 5 in place and sealed. This entire apparatus is joined at flanges 13B to form part of a pressurized pipeline (FIG. 1). This assembly is meant to be capable of remaining in a dormant but potentially operable state. When it becomes n-cessary for the flow line E—E to be closed off at 13 or field operation is performed, a pass-through valve assembly 3 in its open position is attached by fluid-tight joining means 2 to the fitting assembly 1. Next a bonnet assembly 4, without a main gate 14, is attached by a conventional fluid tight joining means to the assembly 3. With pin access door 3G removed, a main stem 4A, with a tool guide/clevis 4C attached, is transported by actuator 4B from the bonnet housing 4D, into the assembly 3 until it is observed through door 3G that 4C has nested over closure member beam 5H and holes 5M and 4H are aligned. Pins 9 are then installed in such holes, thereby joining the assemblies 4 and 5. The accurate movement and alighment of clevis 4C is assured by its engagement with guides 8 throughout its travel. The door 3G is installed in a fluid-tight manner over its opening in the assembly 3. By means of its actuator 4B, the stem 4A is now caused to exert downward mechanical trhust against the assembly 5 thereby holding it in place to permit removal of the hold-down nuts 7. If any change is made to the closure seal 5B by such action it will be only a slight further displacement of seal 5B causing it to seal even tighter between closure member body 5C and closure chamber 1A. With stem 4A holding assembly 5 in place, hold-down nuts 7 may be readily removed from bolts 5A and hold-down chambers 1C can be closed off in a fluid-tight manner by chamber plugs 6.

The entire apparatus is now fluid-tight and can be pressurized without substantial fluid transfer. The actuator 4B may now be turned to move the stem 4A, the clevis 4C, and the assembly 5 out of the closure chamber. The pipeline system fluid will travel around the seal 5B, filling and pressurizing assemblies 3 and 4. The actuator 4B now transports the assembly 5 up through assembly 3 and into bonnet housing 4D. The pass-through valve gate 3E is then closed, thereby isolating the assemblies 4 and 5 from the system pressure. The assemblies 4 and 5 may now be separated from the rest of the apparatus. The stem 4A is raised out of housing 4D until the pins 9 have cleared the bonnet flange 4E and are accessible. The pins 9 may now be removed thereby releasing the assembly 5 from the clevis 4C. The assembly 5 is removed and replaced by main gate 10 (FIG. 13). The pins 9 are reinstalled through the holes 4H of the clevis 4C and the mating-holes of gate 10, thereby joining the assembly 4 to the gate 10. The actuator 4B retracts the stem 4A, and its attachments 4C into the bonnet 4D. The bonnet assembly 4 is joined in a fluid-tight manner to pass through valve assembly 3. The pass-through gate 3E may now be opened, thereby allowing the pipeline fluid to fill and pressurize the bonnet assembly. The main stem actuator 4B is now oerated to move the gate 10 through the assemblies until the gate 10 assumes its closed sealing position with respect to the valve body 13. The apparatus has now completed it required function of closing flow E—E' of FIG. 1.

The procedure as detailed above is simply reversed to remove the gate valve plate and return the valve body 13 to its free flow-through conditions illustrated.

FIG. 13 is a combination of a standard main gate 10 which has then been reshaped at one end to be attached to the bottom of closure member assembly 5, as for instance by attachment to a special retainer plate 5E that is adapted to be connected to a closure member beam 5H as heretofore described. The gate 10 is attached to assembly 5 in such a position that when the closure 5 is seated to fitting assembly 1, then gate 10 is in position with respect to assembly 13 to maintain the seal 11 against the seating surface 13A, effecting a closing of the flow line E—E' of assembly 13.

While the main gate 10 is illustrated as a gate plate it may be of any otherplate that only partially closes off the flow line E—E, for instance an orifice plate.

FIGS. 15 and 16 detail the versatility of assembly 5' shows different seal 5B' taking the place of the seal 5B heretofore described. This alternate seal 5B is a standard female adapter vee packing ring. Vee rings of this type are standard manufactured items, available in differing compounds designed to handle various fluid situations encountered in industrial pressure systems. By displacing the seal 5B with the motion of a semi-rigid male packing adapter 5N (another standard part) three things occur: the seal 5B is kept from being accidently snagged and pulled away from the assembly during the installation or removal operations of the closure member 5 because its female vee is captured and held by the male vee of the adapter 5N; the need for bevel 5K is eliminated on the spacer 5D because seal 5B is no longer in a position to get pinched between the spacer 5D and the retainer 5E; as 5N is driven upwardly the seal 5B is wedged outwardly by the out board face of adapter 5N. Such wedging causes the pressure responsive lips of the vee 5B to contact the wall of the chamber 1A.

FIG. 17 shows a modified means of joining the assembly 3 to the assembly 1. The flange 3H previously described is modified to reposition a seal ring 3C so that such seal faces up to the outside diameter perimeter of the flange 1H rather than the surface 1L of flange 1H. This seal is also hydraulically driven against the O.D. surface of 1H as per the technique detailed in U.S. Pat. No. 3,923,082 that issued to Advance Valve Installation, Inc. Basically, a suitable hydraulic pressure source 15 pumps a suitable hydraulic fluid through an hydraulic through-hole 3P thereby displacing the seal 3C towards the O.D. surface of the flange 1H. Because of the displacement forces that can be exerted on the seal 3C by such an arrangement there is no need to machine or form a seating surface, such as 1L on the flange 1H, thereby reducing the manufacturing cost of the fitting assembly 1. The location of seal 3C in this alternate and the positive displacement of such seal (non-dependent on system pressure or flanges 3H and 1H being held in contact) make this a superior seal arrangement with respect to resisting violent system pressure changes and with respect to its adaptability to loose manufacturing tolerances for the flange 1H.

FIG. 14 indicates the invention adapted to use on a pipeline tee. Because of its essentially cylindrically shaped sections, a tee, or just a section of pipe, can be used for valving or control functions with the addition of a seating surface 13A and a a radial through-port opening like 1D of FIG. 8, and positioning a chest area 13D, properly with respect to a radial through-port in the tee or pipe section. The advantage of such an arrangement is the elimination of one or both end connections such as flanges 13B (FIG. 2) at a given installation along with the necessary mating system flanges and necessary fastening hardware.

What is considered new and sought to be secured by letters patent is:

1. A fluid system including a fitting having a flow-through passageway therethrough and an opening in the wall thereof for moving a desired member into and out of the fitting while the fitting is a part of the system, said fitting having a first mating surface for receiving apparatus for manipulating such member into or out of position, which mating surface surrounds said opening, in combination with a structure for facilitating making changes within the fitting while the fitting is part of the system and without closing down of the system, said structure including an operating mechanism and joining means adapted to be interposed between the operating mechanism and the fitting, the joining means including a pass-thru gate, means for releasably connecting the joining means to and between the fitting and the operating mechanism, said joining means having a joining mating surface cooperating with said first mating surface to produce a fluid-tight seal between the fitting and the joining means around said opening, the fitting having at least one thru-hole, extending therethrough and located between the opening in the wall of the fitting and the inner periphery of said fluid-tight seal, a closure member for said opening in the wall of the fitting, said closure member having at least one hold-down fastener passing through said thru-hole and retaining the closure member to the fitting, and a means for establishing removable fluid-tight closure closing the thru-hole.

2. Apparatus according to claim 1 wherein the operating mechanism has at one end a pattern of through-holes and there are a number of hold-down fasteners passing through said through-holes to retain the operating mechanism to the fitting.

3. Apparatus according to claim 2 wherein the joining means provide knuckling joints between the fitting and the joining means.

4. A pressure fluid conduit system including a section in the fluid flow path having a flow passageway therethrough and having an opening in its periphery, a closure for said opening, said section having a first means extending from the portion of the section where the opening is located providing an area surrounding the opening and located outside of the interior of the pressure system for receiving and holding in fluid sealing relation a structure for facilitating making changes in the system through said opening, said first means having at least one thru-hole between said opening and said surrounding area with both ends of the thru-hole located outside of the interior of the pressure system, hold-down means securing the closure in position and extending through the thru-hole, and means for receiving and releasably holding a plug in position sealing the thru-hole to prevent flow of fluid through the thru-hole upon removal of said cosure.

5. A system of claim 4 wherein said hold-down securing means comprises bolt means extending thru the thru-hole and secured at one end to the closure and having a locking nut on the other end.

6. A system according to claim 5 wherein the means for holding a plug in position sealing the thru-hole comprises a ring secured to first means around the thru-hole which ring is open to the ambient atmosphere around said section, and a removable sealing closure for the open end of said ring.

7. A fitting for establishing fluid flow from a pressure vessel, said fitting having a flow-thru passageway, a removable closure member for the passageway at one end thereof, a flange surrounding the passageway at said one end, said flange having at least one thru-hole extending therethrough, a hold-down fastener extending from the closure member and through the thru-hole from one side of the flange to the other side thereof, means for releasably holding said fastener against retraction from the thru-hole, means for establishing a removable fluid tight closure for the thru-hole when the fastener has been retracted, the flange including a sealing area surrounding the flow-thru passageway and all the thru-holes, the flange extending radially of the passageway beyond the radial extent of the removable closure of provide a continuous surface surrounding the area that includes the flow-thru passageway and the thru-hole, to which extended flange area a fluid-tight connection may be made with equipment for surrounding the closure member to facilitate removal thereof while the fitting is connected to a pressure vessel under pressure.

* * * * *